US011286188B2

(12) United States Patent
Syal (10) Patent No.: US 11,286,188 B2
(45) Date of Patent: Mar. 29, 2022

(54) AUTOMATED WASTEWATER TREATMENT SYSTEM AND METHODS

(71) Applicant: Ashok Syal, Reston, VA (US)

(72) Inventor: Ashok Syal, Reston, VA (US)

( * ) Notice: Subject to any disclaimer, the term of this patent is extended or adjusted under 35 U.S.C. 154(b) by 803 days.

(21) Appl. No.: 15/725,343

(22) Filed: Oct. 5, 2017

(65) Prior Publication Data
US 2018/0099890 A1    Apr. 12, 2018

Related U.S. Application Data

(60) Provisional application No. 62/406,967, filed on Oct. 12, 2016.

(51) Int. Cl.
*C02F 9/00* (2006.01)
*C02F 1/00* (2006.01)
(Continued)

(52) U.S. Cl.
CPC ............ *C02F 9/00* (2013.01); *B01D 21/0009* (2013.01); *B01D 21/0045* (2013.01); *B01D 21/0084* (2013.01); *B01D 21/01* (2013.01); *B01D 21/2438* (2013.01); *B01D 21/2444* (2013.01); *B01D 21/2461* (2013.01); *B01D 21/32* (2013.01); *B01D 21/34* (2013.01); *C02F 1/008* (2013.01); *B01D 21/2433* (2013.01);
(Continued)

(58) Field of Classification Search
CPC .... C02F 1/008; C02F 1/00; C02F 1/24; C02F 1/325; C02F 1/40; C02F 1/463; C02F 1/52; C02F 1/76; C02F 9/00; C02F 11/122; C02F 11/125; C02F 2001/007; C02F 2101/32; C02F 2103/007; C02F 2209/06; C02F 2209/10; C02F 2209/40; C02F 2209/42; C02F 2303/02; C02F 2303/04; B01D 21/0009; B01D 21/0045; B01D 21/0084; B01D 21/01; B01D 21/2438; B01D 21/2444; B01D 21/2461; B01D 21/32; B01D 21/34; B01D 21/2433; B01D 21/24; B01D 21/00
USPC ....................................................... 210/745
See application file for complete search history.

(56) References Cited

U.S. PATENT DOCUMENTS

3,901,807 A * 8/1975 Trump ................ H01J 33/00
422/187
8,262,914 B2   9/2012 Mitzlaff et al.
(Continued)

*Primary Examiner* — Akash K Varma (57) ABSTRACT

A machine and methods using electro-chemical treatments, sedimentation processes and dissolved air flotation technologies for clarification of several kind of wastewater produced in industries, sewages, ponds, lakes, canals etc. The machine comprises of, feeding lines with multiple feeding point, a tank and further a collection tank. The wastewater is passed into the feeding line which may comprises of several feeding points for coagulants, flocculants, and other chemicals dosing into the flow of wastewater and may also comprises of a static mixer for mixing the coagulants, flocculants, and other chemicals with wastewater to agglomerate any solid particles and to accelerate separation of the solid particles in the tank. Once the solid are formed, they can go up or down, therefore to remove the suspended solids the outlet are rearranged depending on the suspended solids. Further, the machine is used for treatment of wastewater utilising multi pass concept to produce clean water.

8 Claims, 8 Drawing Sheets

(51) Int. Cl.
  B01D 21/32 (2006.01)
  B01D 21/01 (2006.01)
  B01D 21/24 (2006.01)
  B01D 21/00 (2006.01)
  B01D 21/34 (2006.01)
  *C02F 11/122* (2019.01)
  *C02F 101/32* (2006.01)
  *C02F 103/00* (2006.01)
  *C02F 1/52* (2006.01)
  *C02F 1/24* (2006.01)
  *C02F 1/40* (2006.01)
  *C02F 1/76* (2006.01)
  *C02F 1/32* (2006.01)
  *C02F 1/463* (2006.01)
  *C02F 11/125* (2019.01)

(52) U.S. Cl.
  CPC ............... *C02F 1/24* (2013.01); *C02F 1/325* (2013.01); *C02F 1/40* (2013.01); *C02F 1/463* (2013.01); *C02F 1/52* (2013.01); *C02F 1/76* (2013.01); *C02F 11/122* (2013.01); *C02F 11/125* (2013.01); *C02F 2001/007* (2013.01); *C02F 2101/32* (2013.01); *C02F 2103/007* (2013.01); *C02F 2209/06* (2013.01); *C02F 2209/10* (2013.01); *C02F 2209/40* (2013.01); *C02F 2209/42* (2013.01); *C02F 2303/02* (2013.01); *C02F 2303/04* (2013.01)

(56) References Cited

U.S. PATENT DOCUMENTS

| | | |
|---|---|---|
| 8,524,089 B2 | 9/2013 | Tsai |
| 9,089,796 B2 | 7/2015 | Tsai |
| 2010/0224569 A1 | 9/2010 | Mitzlaff |
| 2012/0152850 A1* | 6/2012 | Tsai .................. B01D 21/0084 210/182 |
| 2013/0062288 A1* | 3/2013 | Spani ....................... E03F 5/14 210/709 |
| 2013/0213895 A1* | 8/2013 | Criswell .................. C02F 1/24 210/709 |
| 2014/0332450 A1 | 11/2014 | Wiemers et al. |
| 2015/0284263 A1 | 10/2015 | Criswell |

* cited by examiner

FIG. 8 (continued on next page)

FIG. 8

AUTOMATED WASTEWATER TREATMENT SYSTEM AND METHODS

CROSS REFERENCE TO RELATED APPLICATION

This application claims priority on U.S. Provisional Patent Application No. 62/406,967, entitled "AN AUTOMATED WASTE WATER TREATMENT SYSTEM AND METHODS", filed on Oct. 12, 2016, which is incorporated by reference herein in its entirety and for all purposes.

FIELD OF THE INVENTION

This invention relates generally to treatment of waste liquids; and more particularly to a machine and method for treating wastewater utilizing electro-chemical treatments, sedimentation processes and dissolved air flotation technologies in an integrated manner. Further, the invention relates to an automated system and methods for treating wastewater that controls contaminant levels of a plurality of contaminants present in the wastewater while simultaneously minimizing capital costs and chemical treatment costs. The system combines a variety of treatment and post treatment steps in a compact unit capable of electro-chemical, sedimentation, floatation and disinfection treatment by mixing coagulants, flocculants, and other chemicals in flow of the wastewater. Further, the invention relates to the system configured for treatment of wastewater utilising multi pass concept to produce clean water.

BACKGROUND OF THE INVENTION

The environmental regulations are getting harder and harder with regards to deposition and disposal of wastewater and there is therefore an increased demand for fast and effective treatment of wastewater from harbours, channels, ponds, canals, rivers, dams, industrials waste etc.

Known methods of treating wastewater are usually carried out in following steps; easily settled solids are separated from a liquid medium by sedimentation, suspended solids and emulsified matter are removed by assisted coagulation, flocculation, unassisted flotation or dissolved air flotation (DAF) and remaining dissolved matters may be treated chemically to precipitates, or biologically to digested solids, for separation from the liquid medium. The solids separated by these treatments are usually dewatered before incineration or disposal by other means.

A variety of prior art systems and methods are available for wastewater treatment. Systems having settling tanks for separation of sludge from liquids through sedimentation have been in widespread use. Sedimentation methods are used for the removal of solid sludge contained in the wastewater. If solids sludge is heavier, a sedimentation method is employed and implemented in a wastewater sedimentation treatment tank or facilities.

Dissolved air flotation systems (DAF's) have been employed for wastewater treatment wherein air bubbles are introduced, preferably at a lower portion of the flotation tank to carry particles suspended in the liquid to the surface thereof. The solids at the surface aggregate together, either naturally or through the use of coagulant additives, thereby permitting removal of at least some portions of the solids from the wastewater.

In the DAF systems, the time required to treat a given wastewater stream depends upon many variables such as flow rate, turbulence of the wastewater stream, contaminant levels, residence time of air bubbles in the DAF tank. Due to the unpredictable nature of these variables there may be a considerable time lag between introduction of treatment chemicals into the wastewater stream and acceptable effluent contamination levels at the outlet of the DAF. Many wastewater contaminants may include oils, greases, fats, and other emulsified particles. Besides many wastewater types also contain heavy metals, dirt, heavy particles. Treatment of these types of contaminants often includes the use of coagulants, flocculants, and other chemicals to produce colloidal particles, termed "flocs" which can then be removed by sedimentation. However, neutralizing these contaminants must be carefully monitored because in too much accumulation these flocs tend to break apart. In these kinds of situations, the wastewater treatment chemicals have been utterly wasted, and the wastewater must be re-treated before its release into the effluent stream.

In order to properly balance the chemical additives required to treat a contaminated wastewater stream, typically a plurality of "jar" tests with a differing chemical additives, or alternatively a combination of chemical additives, in differing amounts are performed to arrive at an optimal dosing rates of the combination of chemical additives. This is to avoid the use of expensive and perhaps even environmentally hazardous chemicals and to keep the amount of chemical additives as low as possible. Depending on the contaminants present in the wastewater, many a times perfect separation of solids results in sedimentation of flocculated particles, whereas at other times separated solid particles tend to float up. Similar phenomenon can also occur while using electro-chemical or electro-coagulation based solids separation. This requires independent self-contained equipments for each type of wastewater contaminants. Especially in industrial situations where wastewater contaminants may vary each time a production process is switched thereby changing the characteristics of the wastewater.

Therefore, there are many drawbacks or difficulties in prior art systems and methods for wastewater treatments. One of the difficulties is that if the wastewater stream changes appreciably, the additives must be readjusted, thereby requiring additional jar tests. Additionally, a change in wastewater stream flow requires the pumps to be adjusted, since the proportion of additives must be adjusted proportionally to the wastewater stream flow. Furthermore, it is impractical to train personnel to monitor the effluent stream, conduct periodic and frequent jar tests, calculate additive flow rates, make pump adjustments, and carefully monitor incoming stream flow rates in order to maintain the operation. It is even more difficult when the separated solids change their behavior between settling and floating.

Thus, there is a need for a new and improved apparatus and methods for treating wastewater and other liquids utilizing combination of sedimentation processes, electro-chemical treatments and dissolved air flotation technologies. Further, there is need of a system which senses the parameters of wastewater at inlet before adding chemical additives and that should require extremely low maintenance, avoids using different system for different process and comprises of an active integrated programmable treatment system. The programmable computer control subsystem is arranged for continuous real time monitoring of a plurality of sensed parameters at beginning from inlet of the system, and for continuously comparing the sensed parameters with a plurality of preprogrammed input data for continuously generating dosing parameters for chemical additives in real time. Further, there is a need for a system that can be automated wastewater treatment which is capable of monitoring an influent stream, and adjusting additive flow rates accordingly. In addition to coagulants, flocculants, and other chemicals dosing rates, the system must also be able to act as a sedimentation system or a floatation system with minimal changes in the inlet and outlet connections both for treated water and the concentrated solids collected as sludge.

SUMMARY OF THE INVENTION

The present invention relates to an integrated automated wastewater treatment machine and methods using electro-chemical treatments, sedimentation processes and dissolved air flotation technologies for clarification of several kind of wastewater produced in industries, sewages, ponds, lakes, canals etc.

This invention is useful for efficiently treating large volumes of running wastewater and maintains the continuous supply of treated water simultaneously. The treatment takes place while the wastewater is moving with programmed speed inside the machine with very little residence time. Thus making the machine compact.

The automated wastewater treatment machine of the present invention is a compact wastewater treatment unit for treating wastewater and other liquids utilizing electro-chemical treatments, sedimentation processes and dissolved air flotation technologies. A central control command system is managing the configuration set up and enables switching between one process and the other.

The machine comprises of an inlet for incoming wastewater, a feeding line with multiple feeding points, a tank referred to as sedimentation cum floatation tank and a collection tank. The feeding line is connected to the tank to which the inlet for wastewater is connected that leads wastewater under pressure into the tank. The wastewater is passed into the feeding line which may comprise of several feeding points for injection of coagulants, flocculants and other chemicals dosing into the flow of wastewater and may also comprise of a static mixer for mixing the coagulants, flocculants and other chemicals with wastewater to agglomerate any solid particles and to accelerate them in a gravity or a floatation based separation system.

The static mixer is provided to encourage mixing of coagulants, flocculants, and other chemicals for the development of flocs to provide wastewater suitable for dewatering and filtering.

The tank has a first outlet for treated water and a second outlet for sludge for deposit or for further treatment. The second outlet is for removing sludge, which are flocs floating at upper end of tank and as well as solid particles from the bottom of the tank. In one embodiment, depending upon the wastewater, the outlet can be rearranged to remove the sludge. For example, if the suspended particles are floating at the top of the tank, then the suspended particles are captured and discharged to the second outlet. Therefore, the machine of the present invention can be used in both cases as sedimentation as well as dissolve air flotation (DAF) process.

There are several measuring and sensor devices mounted in the feeding lines for measuring the parameters of incoming water in the machine. Such as a TSS sensor, a flow meter and a pH sensor for measuring the incoming rate of suspended solids in the wastewater, flow rate of the incoming waste water and pH of the wastewater. This arrangement helps in ascertaining optimum quantity of coagulants, flocculants and other chemicals to be mixed and their respective injection positions in the inlet pipe. A variety of injection points are provided to sequence the additives and polymer additions.

Further, the machine is provided with a liquid level sensor in the tank for monitoring of water level. If the tank exceeds the set level, the level sensor sends a signal to the computer board to close the inlet valve for a time period until the clarified water is discharged through the first outlet.

The controller is operatively coupled to the monitoring instruments or sensors, which provide a signal representative of different parameters at a point or points in the effluent stream for determining whether the effluent stream at first outlet is within an acceptable required range. Additionally, the pH of the wastewater stream must be modified to an acceptable level by the addition of acid or bases into the wastewater stream, and frequent testing of pH levels of the effluent stream to maintain proper pH balance.

The tank further includes an inclined plate assembly disposed therein. In a particular embodiment, the plate assembly is disposed within the settling zone. The size and arrangement of the plate assembly will vary to suit a particular application. Thus, according to the invention, there is provided a set of plates that can be inclined or keep vertical for moving in horizontal direction facilitating removal of sludge from the bottom. In another configuration the inclined plate assembly will collapse to a wall side of the tank to allow all the flocculated particles to freely float up as sludge, leaving treated water to be discharged without any suspension.

The tank further includes motorized skimmers disposed therein. In a particular embodiment, the skimmer blades are extending below the intended level of the tank to capture scum or floats and deliver and deposit the same to the sludge outlet opening. Alternatively or in addition to, the float may be removed by the skimmer for further treatment or, in some instances, recovery of materials.

The machine comprises an ultrasonic sludge sensor for gauging the level of sediments deposited at the bottom of the tank. The sludge outlet is arranged at the bottom of the tank, and a screw moves sediment to the sludge outlet. Preferably, the screw assembly comprises at least one longitudinal feeding screw, arranged longitudinally at the bottom of the tank. Oscillating slide plates placed between the screw discs help in concentrating the sludge before the sludge outlet is opened. Further, a level indicator is arranged above the sludge outlet to measure the sludge accumulation there.

At the outlet, there is at least one UV lamp that kills the bacteria and other life forms present in water so as to disinfect and make the clarified water free from bacteria.

Further, the tank comprise of a filter assembly to restrict the smaller size of solid particles to pass into outlet of clean water. In a preferred embodiment, the filter assembly filters the solid particles that cannot sediment or cannot float in the water. The inner layer of the tank is coated with anti-frictional agents for easy settling of solid particles by enhancing the settling velocity of the solid particles and also to ensure that the solid particles do not adhere with surface of the inner layer of the tank. The anti-friction agents are but not limited to Teflon high molecular weight polyethylene oxide, a derivative of polyethylene oxide or an acrylate copolymer containing polyethylene derivatives.

The tank may comprise of a dissolved air bubbling device for introducing air bubbles into wastewater thereby aiding in separation and flotation of coagulated solids to the surface of the tank. It should be noted that throughout this specification for purposes of clear explication, the present invention may be practiced in conjunction with a broad spectrum of wastewater sedimentation systems and DAF wastewater treatment and the like, without departing from the scope of the invention.

In one embodiment, the present invention provides a method of treating wastewater comprising of following steps; chemical (e.g., polymers) dosing at feeding lines to remove suspended and precipitatable solids, oxidation and ozonation to increase dissolved oxygen thereby decreasing chemical oxygen demand (COD) and biological oxygen demand (BOD) levels, electro-coagulation to remove dissolved contaminants. Once the solids are formed, they can go up or down, therefore to remove the suspended solids the outlets are rearranged depending on the suspended solids characteristics weather floating or settling. Further, the treated water is chlorinated to remove the odor and color and also UV lamps provided at outlet that kills the bacteria and other life forms present in water so as to make the clean water free from bacteria.

In another embodiment, the machine comprise of a monitoring device including water quality measurements parameters which indicates the quality of water at outlet. If the quality of treated water does not meet the required parameters, then outlet valve will not open for discharge of the treated water. The treated water will be recirculated to the feeding lines for further processing until the parameters are met. The machine may further include a second positive displacement pump for recirculating treated water from the tank to the inlet of feeding lines for retreatment if the parameters are not achieved in the first pass treatment. Therefore, an advantage of the present invention is that the machine is used as both single pass treatment and multi pass treatment. Further a flow meter is arranged in the tank for the controlling the flow rate during multi pass treatment.

BRIEF DESCRIPTION OF THE DRAWINGS

The following invention will be described with reference to the following drawings. The drawings and the associated descriptions are provided to illustrate embodiments of the invention and not to limit the scope of the invention.

DETAIL DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments are possible.

For the purposes of this invention, "wastewater" is meant any type of water found in sewage pipes or any water discharged from domestic, commercial, industrial, agricultural or aquaculture (fresh or marine) processes, or groundwater, bore water and reservoir water. The wastewater may contain contaminants such as, organic substances, such asnitrates, proteins, fatty acids, polysaccharides and phospholipids, larger biologicalmaterial, such as bacteria, viruses and algae, colloidal material, inorganic matter, leachates, metal ions, colour and particles.

In accordance with some embodiments, an integrated automated wastewater treatment machine using electrochemical treatments, sedimentation processes and dissolved air flotation technologies for clarification of several kind of wastewater. The machine comprises of a feeding line with multiple feeding points, a tank and further a collection tank for tertiary treatments. A feeding line connected to the tank to which the inlet for wastewater leads into the tank. The wastewater is passed into the feeding line which may comprise of several feeding points for coagulants, flocculants and other chemicals dosing into the flow of wastewater and may also comprise of a static mixer for mixing the said Coagulants, flocculants and other chemicals with wastewater to agglomerate any solid particles in the water and to accelerate gravity separation as well as floats separation of the solid particles. Further, the machine may comprise an electro coagulator is installed in the tank; the electro coagulator supplies an electrical charge to the wastewater, and changes the suspended solid particle surface charge, allowing suspended solid to form an agglomeration. Electrocoagulation also produces hydrogen peroxide as by product which helps in the treatment. An Electrocoagulation device is connected at the outlet end of the chlorinator and the UV lamp for removing the contaminant left behind after secondary treatment.

With reference to the figures, numerical designation has been given for each element to facilitate the reader's understanding of the present invention, and particularly with reference to the embodiments of the present invention illustrated in the figures; various preferred embodiments of the present invention are set forth below. The enclosed description and drawings are merely illustrative of preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Now referring to the FIGS. 1-4, the machine 100 comprises of, feeding lines 102 with multiple feeding pumps 103, a tank 104 also referred as sedimentation and flotation tank and further a collection tank 106. The feeding line 102 connected to the tank 104 having an inlet 107 for wastewater leads into the tank 104. The wastewater is passed into the feeding line 102 which may comprise several feeding points 103 for coagulants, flocculants and other chemicals dosing into the flow of wastewater and may also comprises of a static mixer for mixing the said Coagulants, flocculants and other chemicals with wastewater to agglomerate any solid particles in the water.

Prior to treatment of water using the machine 100, the water may be analysed to assess the composition of the water and the nature of suspended solids, if present. Additional or modified process steps may be required when treating water comprising other contaminants, to contend with differing chemical properties of the contaminants. Different coagulants, flocculants, and other chemicals may be utilised.

Coagulants, flocculants, and other chemicals may be injected through the feeding pumps 103 in the feeding lines 102. These coagulants, flocculants, and other chemicals may be either organic or inorganic in nature. Preferably, the coagulants may be selected from the group consisting of alum sulphate, polyaluminum chloride, ferric sulphate, ferric chloride and inorganic salt-polymer blends. Flocculants may be selected from the group consisting of anionic cationic co-polymer of acrylamide and other polyelectrolytes in an aqueous solution of such polymers. The Coagulants, flocculants and other chemical mix with the water in the feeding lines 102 which preferably comprises of a static mixer. The wastewater then passes into the tank 104.

Wastewater or sewage is supplied through the inlet 107 by a water supply pump into the feeding lines 102. Preferably, the coagulants, flocculants, and other chemicals are mixed with moving wastewater is feeding lines 102.

There are several measuring and sensor devices are placed in the feeding lines 102 for measuring the parameters of incoming water in the machine 100. A pH sensor may be located in the inlet 107 at point to measure the pH of the water on a continuous basis using an automated controller or a microprocessor. As per the requirement for treatment of wastewater, the dosing of acid solution or base solution may be adjusted.

The machine 100 performs electro-chemical treatments, sedimentation processes and dissolved air flotation technologies for clarification of several kind of wastewater produced in industries, sewages, ponds, lakes, canals etc. The machine 100 is a compact wastewater treatment unit for treating wastewater and other liquids.

The feeding lines 102 connected to the tank 104 which may comprise of several feeding points 103 for coagulants, flocculants, and other chemicals dosing into the flow of wastewater and may also comprise of a static mixer for mixing the coagulants, flocculants, and other chemicals with wastewater to agglomerate any solid particles in the water.

In another embodiment, there is a flow meter for measuring the flow rate of said wastewater entering the said machine 100; plurality of pumps 103 for supplying a plurality of chemical additives at variable flow rates to said wastewater stream at a plurality of feeding points 130 on the feeding lines 102.

The static mixer is provided to encourage mixing of coagulants, flocculants, and other chemicals for the development of flocs to provide wastewater suitable for dewatering and filtering.

The static mixer comprise of a connection for supply of at least one coagulant, flocculant, and at least one chemical. The static mixer includes a turbulence means for creating a turbulent flow for mixing incoming wastewater with the at least one chemical, so that the contaminated wastewater and the added chemicals are properly mixed.

The tank 104 connecting to the feeding lines 102 has at least one inlet 107 for contaminated wastewater, a first outlet 109 for purified water and a second outlet 111 for sludge outlet. The second outlet 111 for removing sludge either floating at upper end of tank 104 or sludge sediments at bottom of the tank 104. Therefore the machine 100 of the present invention can be used in both cases for sedimentation as well as dissolve air flotation process.

The inlet 107 of the machine is provided with a TSS sensor and a flow meter for measuring incoming rate of suspended solids in the wastewater. This arrangement helps in ascertaining optimum quantity of coagulants, flocculants, and other chemicals to be pumped.

Further, the tank 104 is provided with a liquid level sensor for monitoring of water level. If the tank 104 exceeds the set level, the level sensor sends a signal to the computer board to close the inlet 107 for a time period until the clear water is discharged through the first outlet 109.

Further, a controller is operatively coupled to the monitoring instruments or sensors, that provides a signal representative of different parameters at a point or points in the effluent stream for determining whether the effluent stream is within an acceptable required range.

Figure 5:
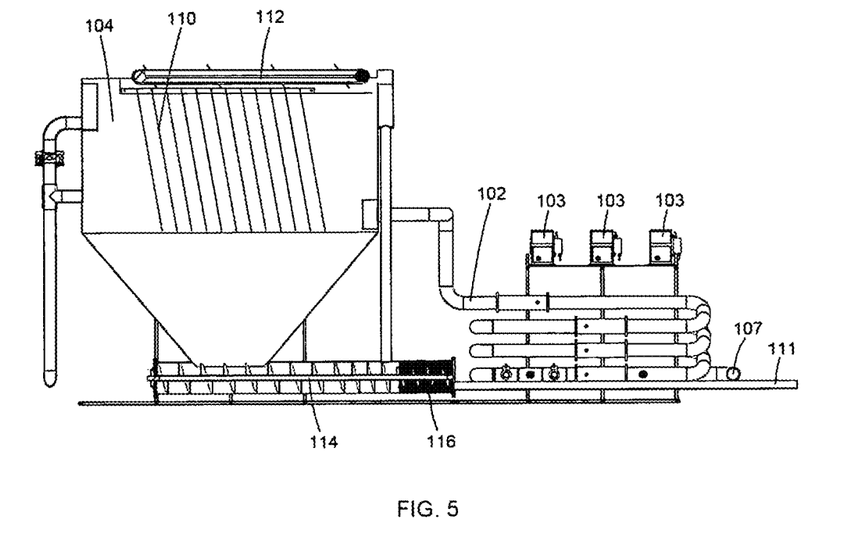
FIG. 5 illustrates a sectional view of the automated wastewater treatment machine of present invention.
Figure 6:
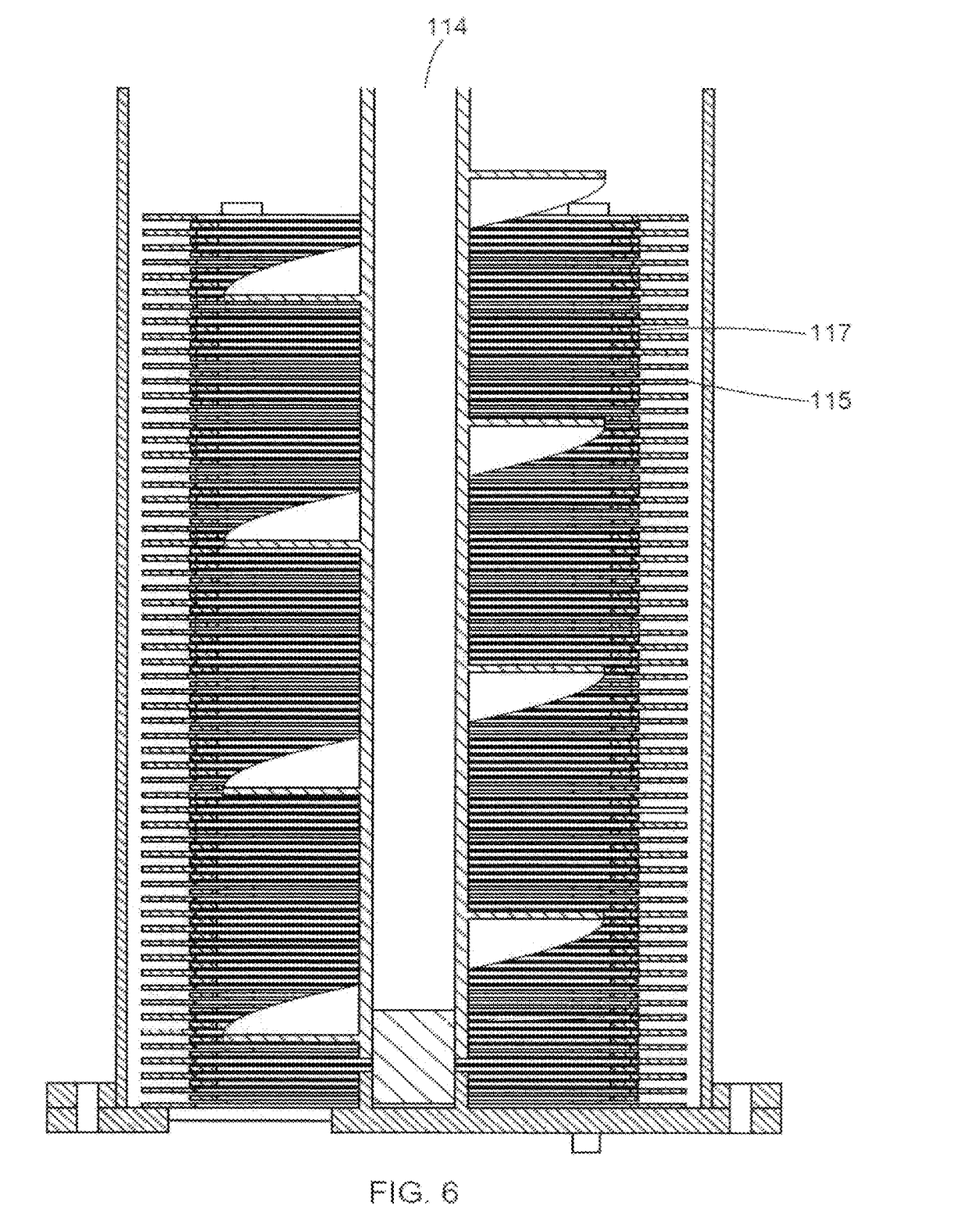
FIG. 6 illustrates exploded view of the automated wastewater treatment machine of present invention.

As shown in FIGS. 5-6, the tank 104 further includes an inclined plate assembly 110 disposed therein. In a particular embodiment, the plate assembly 110 is disposed within the settling zone. The size and arrangement of the plate assembly 110 will vary to suit a particular application. Thus, according to the invention there is provided that the inclined plate assembly 110 is moving in horizontal direction facilitating settling or floating velocity of suspended particles in the tank 104.

The tank 104 further includes motorized skimmer 112 disposed therein. In a particular embodiment, the skimmer blades are extending below the intended level of the tank 104 to capture scum or floating sludge and deliver and deposit the same in the second outlet 111 opening thereof i.e., sludge outlet. Alternatively or in addition to, the float may be removed by the skimmer 112 for further treatment or, in some instances, recovery of materials. The inner layer of the tank is coated with anti frictional agents for easy settling of solid particles by enhancing the settling velocity of the solid particles and also to ensure that the solid particles do not adhere with surface of the inner layer of the tank 104.

The machine 100 comprises of a sludge sensor for gauging the level of sediments deposited at the bottom level of the tank 104 with a screw assembly 114 at the bottom. The second outlet 111 is arranged at the bottom of the tank, and comprises of a screw assembly 114 means for moving sediment to the second outlet. Preferably, said means for moving sediment through the screw assembly 114 comprises of at least one longitudinal feeding screw, arranged longitudinally on the bottom of the tank 104. Preferably, an ultrasonic sludge sensor is arranged above the sludge outlet to measure the sludge accumulation there.

Figure 7:
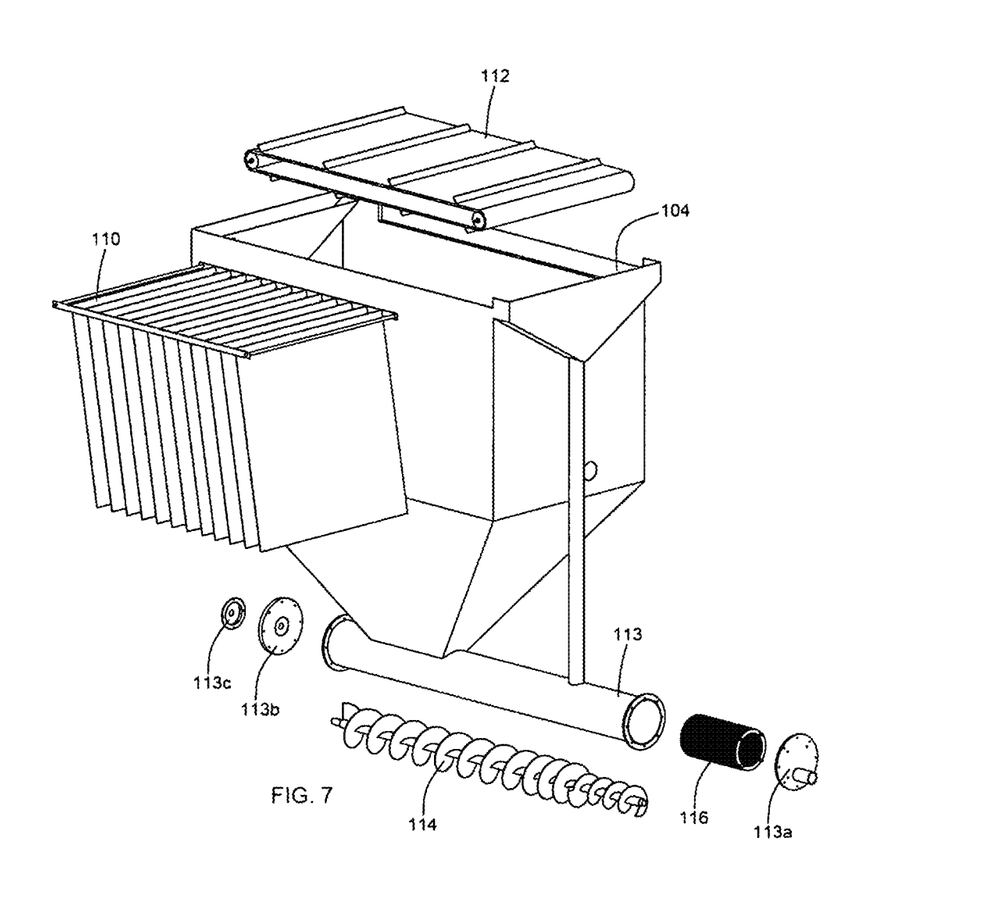
FIG. 7 illustrates sectional view of a screw assembly in the automated wastewater treatment machine of present invention.

FIG. 6 shows the exploded view of arrangements of screw assembly 114 in a housing 113 and a volute 116 at the end, which are secured in the housing 113 with securing plates 113a, 113b. Again, the volute 116 is attached with the screw assembly 114, the volute is structured with a filter element that consists of two types of plates, a fixed plate 115 and a moving plate 117; and the screw assembly 114 that thrusts the filter element and transfers and pressurizes the sludge as shown in FIG. 7. The gaps between the plates 115,117 and the screw pitch are designed to gradually get narrower towards the direction of sludge outlet and the inner pressure of the filter element increases due to the volume compression effect, which thickens and dewaters the sludge.

Again, the tank 104 may comprise of a blower unit for introducing air bubbles into wastewater thereby aiding in separation and flotation of coagulated and flocculated solids to the top surface of the tank 104. It should be noted that throughout this specification for purposes of clear explication, the present invention may be practiced in conjunction with a broad spectrum of wastewater sedimentation systems and DAF wastewater treatment and the like, without departing from the scope of the invention.

Further, a method of the present invention involves taking treated effluent from the tank 104 to the collection tank 106, saturating the effluent with air in the collection tank 106. When the air introduced through a fine air bubble diffuser in the collection tank, it increases dissolve oxygen thus decreasing chemical oxygen demand (COD) and biological oxygen demand (BOD) levels, The bubbles adhere to suspended matter in the water or wastewater feed, causing the suspended matter to float to the top of the tank 104 forming a layer of float material which may be in the form of scum or float.

Figure 1:
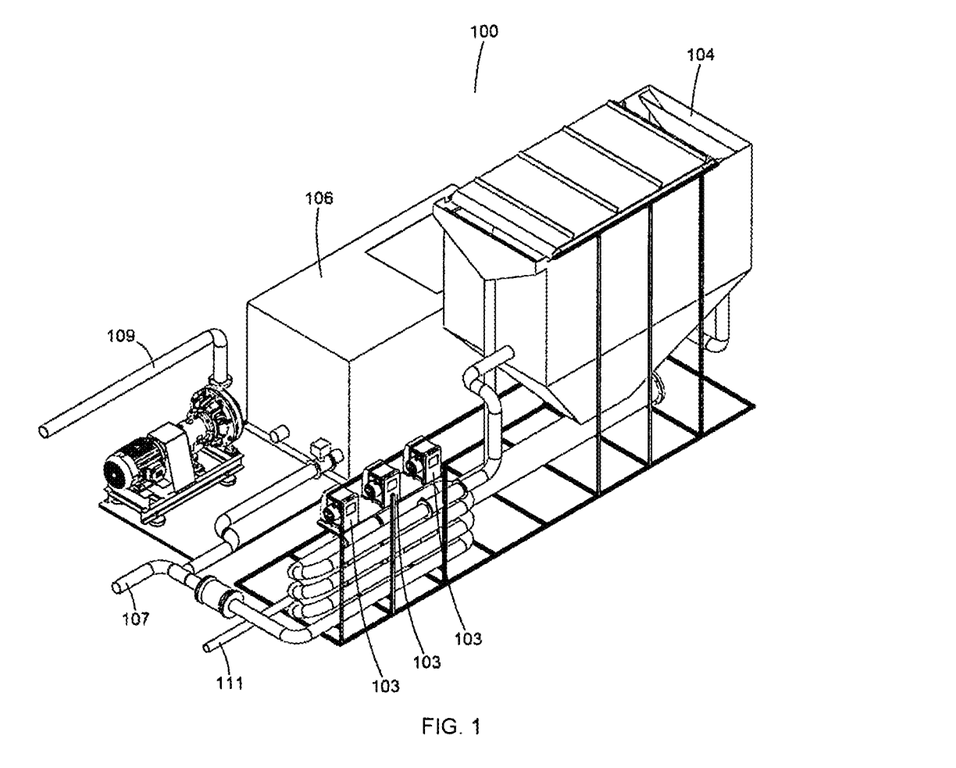
FIG. 1 illustrates perspective view of an automated wastewater treatment machine of present invention.
Figure 2:
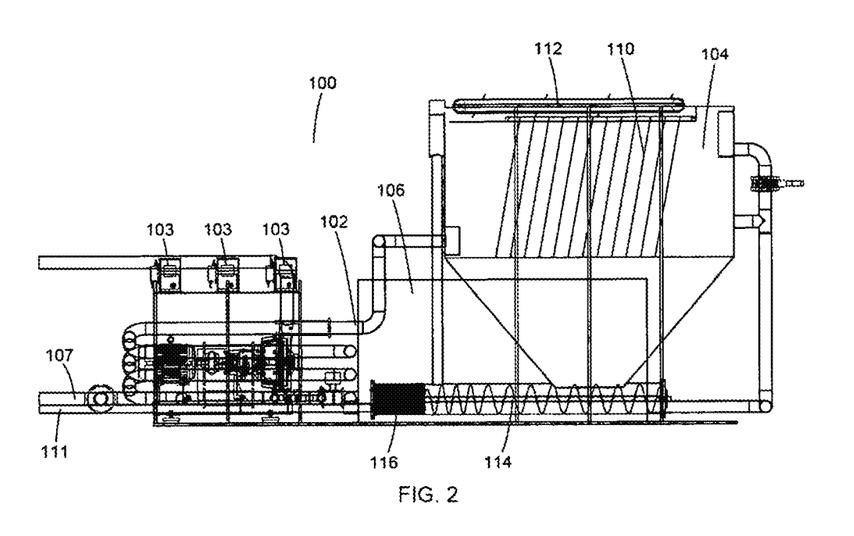
FIG. 2 illustrates a side view of the automated wastewater treatment machine of present invention.
Figure 3:
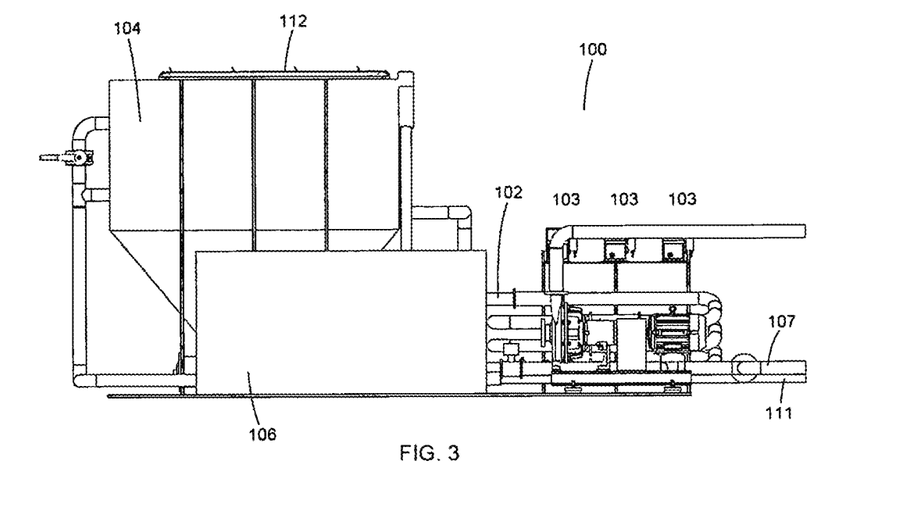
FIG. 3 illustrates another side view of the automated wastewater treatment machine of present invention.
Figure 4:
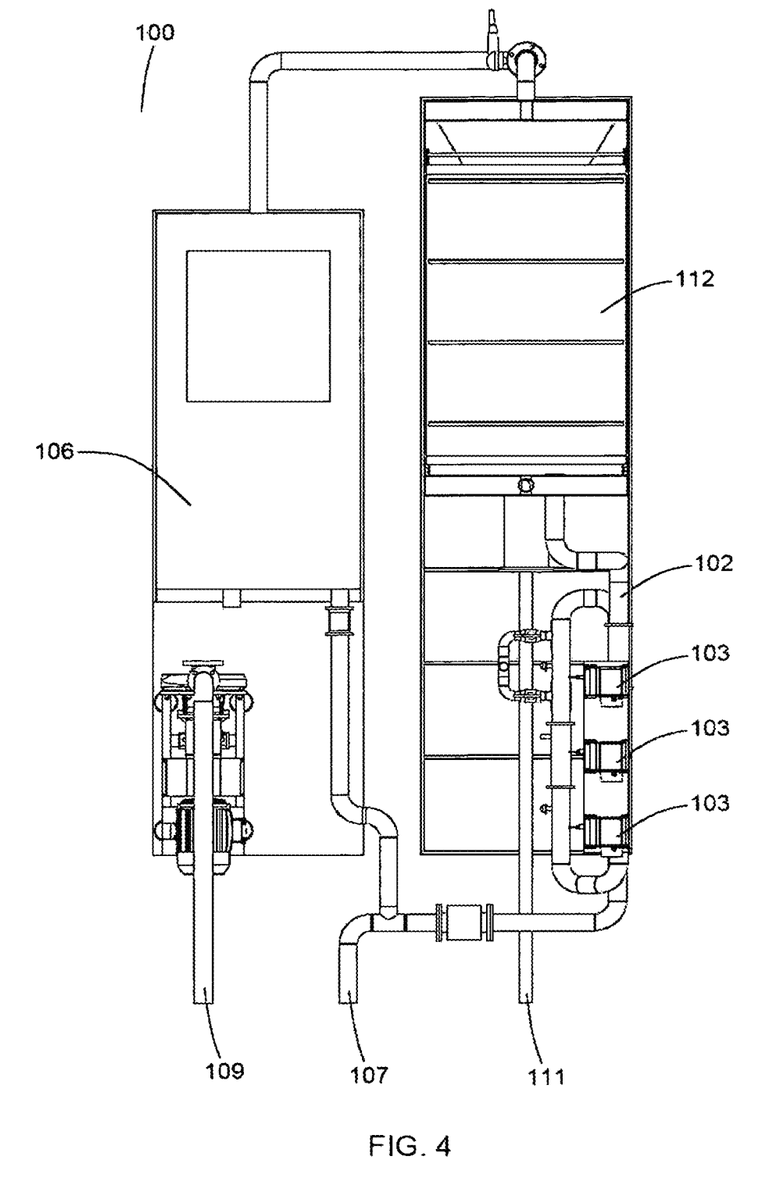
FIG. 4 illustrates a top view of the automated wastewater treatment machine of present invention.

In a preferred embodiment, the machine 100 provides a first discharge pipework for float material associated with dissolved air flotation method, the skimmer adapted to move floats into the housing 113 via a connecting pipe. For tertiary treatment of treated water from the tank 104 transferred into a collection tank 106 as shown in FIG. 1 in which a channel of fine air bubble diffuser is added for saturating water with air to increase dissolve oxygen thus decreasing chemical oxygen demand (COD) and biological oxygen demand (BOD) levels. Further, the treated water is chlorinated to remove the odor and color and also UV lamps provided at first outlet 109 that kills the bacteria and other life forms present in water so as to make the clean water to be used for various purposes.

In an alternate embodiment, a simplified schematic illustration of the machine 100 according to an embodiment is shown in FIG. 1. The components of the machine 100 may include a feed pump, which according to an embodiment is a positive displacement pump, for feeding water or wastewater to be treated through the machine 100, feeding lines 102 for receiving the water or wastewater and configured to introduce coagulant, flocculant and chemicals from many feeding points, and a tank 104 for dissolved air flotation (DAF) or sedimentation process. The machine 100 may further include a second positive displacement pump for recirculating treated water from the collection tank 106 to the feeding lines 102 for retreatment if the parameters are not achieved in the first pass treatment. Therefore, an advantage of the present invention is that the machine 100 is used as both single pass treatment and multi pass treatment. Further a flow meter is arranged in the feeding lines 102 which monitors flow rate of the second positive displacement pump thus adjusting all the coagulant, flocculant and chemicals dosing to be fed in feeding lines 102.

A clean water outlet i.e., the first outlet 109 through which treated water from the tank 104 is discharged via a valve, a further control valve associated with the sludge outlet i.e., the second outlet 111 through which float material as well as sludge from bottom is discharged. At times throughout this specification, the sludge outlet will be referred to as the second outlet 111, and the float outlet connecting to the sludge outlet will be referred to as a first discharge pipework.

Figure 8:
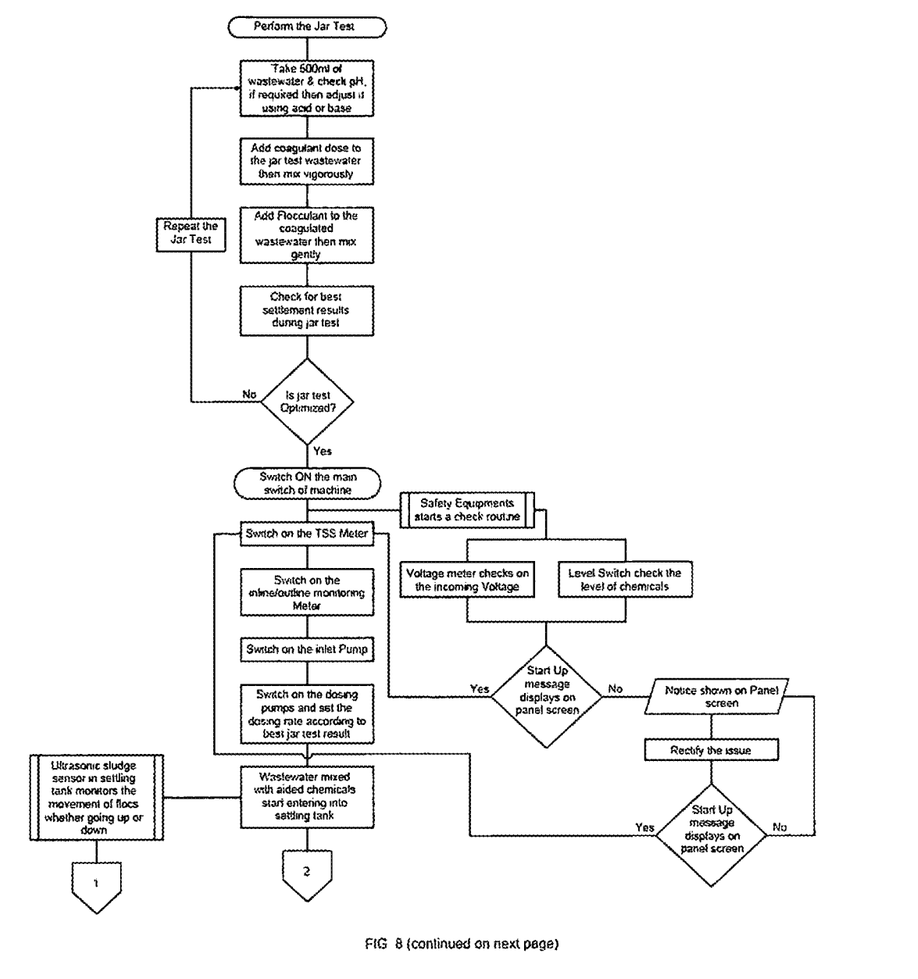
FIG. 8 illustrates process flow chart of a method of using the automated wastewater treatment machine of present invention.

In another embodiment, as shown in FIG. 8 is the method of using the machine 100 for treating wastewater and other liquids utilizing electro-chemical treatments, sedimentation processes and dissolved air flotation technologies. The method is illustrated in the following steps: Step 1, perform a jar test for conduct a jar test to determine the proper balance of additives supplied to the wastewater stream to produce the best turbidity reading. Step 2, switch on the machine and simultaneously a controller having a microprocessor, data memory, and a plurality of inputs and outputs that interface with the controller may start functioning. The controller is operatively coupled to a PH/turbidity meter, or a plurality of other sensors thereof, that provides a signal representative of turbidity and other measurements at a point or points for determining the water parameters and signals to determine the proper balance of additives supplied to the wastewater stream. Step 3, once the solid are formed in the tank, they can go up or down, therefore to remove the suspended solids the outlet is rearranged depending on the suspended solids characteristics weather floating or settling. An Ultrasonic sludge sensor in the Tank monitors the movement of flocs whether going up or down. Step 4, starting a blower for aeration that assist upward movement of flocs. Step 5, removing sludge from bottom of the tank through the screw assembly and further, a volute at end will press the sludge to discharge solid sludge at sludge outlet. Step 6, the treated water is chlorinated to remove the odor and color and also UV lamps provided at outlet that kills the bacteria and other life forms present in water so as to make the clean water free from bacteria. Also the treated water is transferred into the collection tank for the tertiary treatments. The method is illustrated in the steps above only for the purpose of understanding by the person skill in the art without departing from the scope of the invention.

It is to be understood that the above paragraphs describe but one possible sequence of sludge discharge, and the present invention is not intended to be limited to the discharge sequence of the described embodiment.

The water loss or wastage was approximately 1% to 7% of the total volume of water passing through the machine. The advantages of the machine of this invention are as follows: allows the rapid treatment of large volumes of water; the machine carries out a continuous and instant separation and removal of unwanted material from the water; the machine can be automated, compact and portable; the machine has a small foot print in comparison to conventional water treatment systems rendering it very practical for use in highly developed areas where space is scarce and the land is at a premium; the machine comprises of no media, membranes, screens, barriers or the like which require constant cleaning, replacement and treatment for undesirable bacteria; the machine comprises of no moving parts and therefore is less complex, easy to clean and easy to operate; the machine can perform effectively the simultaneous removal of multiple contaminants; electro-chemical treatments, sedimentation processes and dissolved air flotation technologies all are combined to perform in a single machine of the present invention; and the machine is cost effective, the costs of running the machine being a fraction of the cost of running conventional systems. Machine is also capable of performing multi-pass without involving any extra transfer tanks.

Although not shown, the machine may include a suitable control means for controlling the operation of each of the pumps, the valve, and any other device in the system which may require automatic operation.

The person skilled in the art would now appreciate the various advantages of the system embodying the present invention. The system provides a means of treating water or wastewater at high flow rate without compromising the cross sectional size and height of the system and without compromising efficiency.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

I claim:

1. A multi-pass system for treatment of wastewater, comprising:
   an inlet for receiving a wastewater influent, where the inlet includes at least one measurement device or a sensor device for measuring parameters of the wastewater influent;
   a feeding line connected from the inlet, the feeding line having multiple feeding points for dosing coagulants, flocculants, and one or more chemicals into the wastewater influent for a primary treatment;
   a tank for receiving the wastewater influent mixed with the coagulants, the flocculants, and the one or more chemicals for a secondary treatment, and removing sludge either floating at upper end of the tank or settling at bottom of the tank through a sludge outlet after the secondary treatment;
   a first outlet is connected at the upper end of the tank for discharging secondary treated effluent out from the tank;
   a monitoring device is installed at the first outlet for measuring parameters of the secondary treated effluent;
   a collection tank for performing a tertiary treatment;
   wherein the tank further includes a grated plate assembly disposed vertically with an inclined angle that moves in horizontal direction to facilitate the settling or the floating of the sludge,
   a first positive displacement pump for discharging the secondary treated effluent from the first outlet into the collection tank,
   a second positive displacement pump for recirculating the secondary treated effluent from the first outlet to the inlet for retreatment if the parameters of the secondary treated effluent are not achieved in a first pass treatment,
   a third positive displacement pump for carrying the sludge floating at the upper end of the tank to the sludge outlet,
   a screw assembly on the bottom of the tank, the screw assembly comprises of at least one longitudinal feeding screw arranged longitudinally on the bottom of the tank and oscillating slide plates placed between screw discs which help in concentrating the sludge before the sludge outlet is opened,
   a sludge thickening device is attached with the screw assembly, the sludge thickening device is constructed with a filter element consisting of a fixed plate and a moving plate, wherein the screw assembly thrusts the filter element for pressurizing the sludge for thickening and dewaters the sludge,
   wherein an inner layer of the tank is coated with anti-frictional agents that enhances settling velocity of solid particles at the bottom of the tank and further prevents adhering of the solid particles to the inner layer of the tank,
   wherein the sludge outlet is for removing the sludge from the bottom of the tank and the sludge carried by the third positive displacement pump.

2. The multi-pass system of claim 1, wherein the feeding line further comprises of a static mixer for mixing the coagulants, the flocculants, and the one or more chemicals with the wastewater influent to agglomerate the solid particles in the wastewater influent and to accelerate separation of the solid particles by means of gravity or precipitate at the upper end of the tank.

3. The multi-pass system of claim 1, wherein the at least one measurement device or the sensor device helps in ascertaining optimum quantity of the coagulants, the flocculants and the one or more chemicals to be mixed.

4. The multi-pass system of claim 1, wherein the tank is for both dissolved air flotation (DAF) process and sedimentation process for wastewater treatment.

5. The multi-pass system of claim 1, wherein the tank further includes a motorized skimmer having skimmer blades for aggregating the sludge floating at the upper end of the tank towards the third positive displacement pump.

6. The multi-pass system of claim 1, wherein the tank further includes a sludge sensor, the sludge sensor is arranged above the sludge outlet in the tank to measure an aggregation of the sludge.

7. The multi-pass system of claim 1, wherein the monitoring device includes sensors for measuring the parameters of the secondary treated ater effluent at the first outlet.

8. The multi-pass system of claim 1, further comprising a liquid level sensor for monitoring a water level in the tank, accordingly a signal is sent to a computer board to close the inlet for a time period until the secondary treated effluent is not discharged through the first outlet.

* * * * *